(12) United States Patent
Haddad et al.

(10) Patent No.: US 8,650,397 B2
(45) Date of Patent: Feb. 11, 2014

(54) KEY DISTRIBUTION TO A SET OF ROUTERS

(75) Inventors: Wassim Haddad, San Jose, CA (US); Mats Naslund, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 249 days.

(21) Appl. No.: 13/120,679

(22) PCT Filed: Sep. 24, 2008

(86) PCT No.: PCT/SE2008/051068
§ 371 (c)(1),
(2), (4) Date: Mar. 24, 2011

(87) PCT Pub. No.: WO2010/036157
PCT Pub. Date: Apr. 1, 2010

(65) Prior Publication Data
US 2011/0179277 A1    Jul. 21, 2011

(51) Int. Cl.
*H04L 9/32* (2006.01)
(52) U.S. Cl.
USPC .......................................................... 713/168
(58) Field of Classification Search
USPC ................................................. 713/171, 168
See application file for complete search history.

(56) References Cited

U.S. PATENT DOCUMENTS

| | | | |
|---|---|---|---|
| 6,370,380 B1 * | 4/2002 | Norefors et al. ............... | 455/436 |
| 6,539,480 B1 * | 3/2003 | Drews ........................... | 713/191 |
| 6,658,004 B1 * | 12/2003 | Kadansky et al. ............. | 370/394 |
| 7,649,473 B2 * | 1/2010 | Johnson et al. ............... | 340/853.1 |
| 2001/0039619 A1 * | 11/2001 | Lapere et al. ................. | 713/186 |
| 2003/0061480 A1 * | 3/2003 | Le et al. ........................ | 713/153 |
| 2006/0218636 A1 | 9/2006 | Chaum | |
| 2008/0077791 A1 | 3/2008 | Lund et al. | |

FOREIGN PATENT DOCUMENTS

WO    2008/011219 A1    1/2008

OTHER PUBLICATIONS

Haddad, W. et al. "Enabling Source Address Verification via Prefix Reachability Detection." IEFT, Source Address Verification Architecture (SAVA), Internet-Draft, Ericsson Research Nomadic Lab, Jul. 1, 2007.

* cited by examiner

*Primary Examiner* — Dant Shaifer Harriman
(74) *Attorney, Agent, or Firm* — Coats and Bennett PLLC

(57) ABSTRACT

Before actually communicating information/data between two endpoints (C, S) connected to a network a secure and confidential distribution of a special key (K h) is performed to nodes (R j) along a path in the network. This is allowed by performing a path handshaking procedure in which first a hint token is forwarded along the path in a first direction and then a disclosure token is forwarded in the opposite direction. In forwarding the disclosure token it is verified in the nodes against the already received hint token. This assures that only nodes on-the particular path will receive the special key or possibly some other information related thereto.

29 Claims, 7 Drawing Sheets

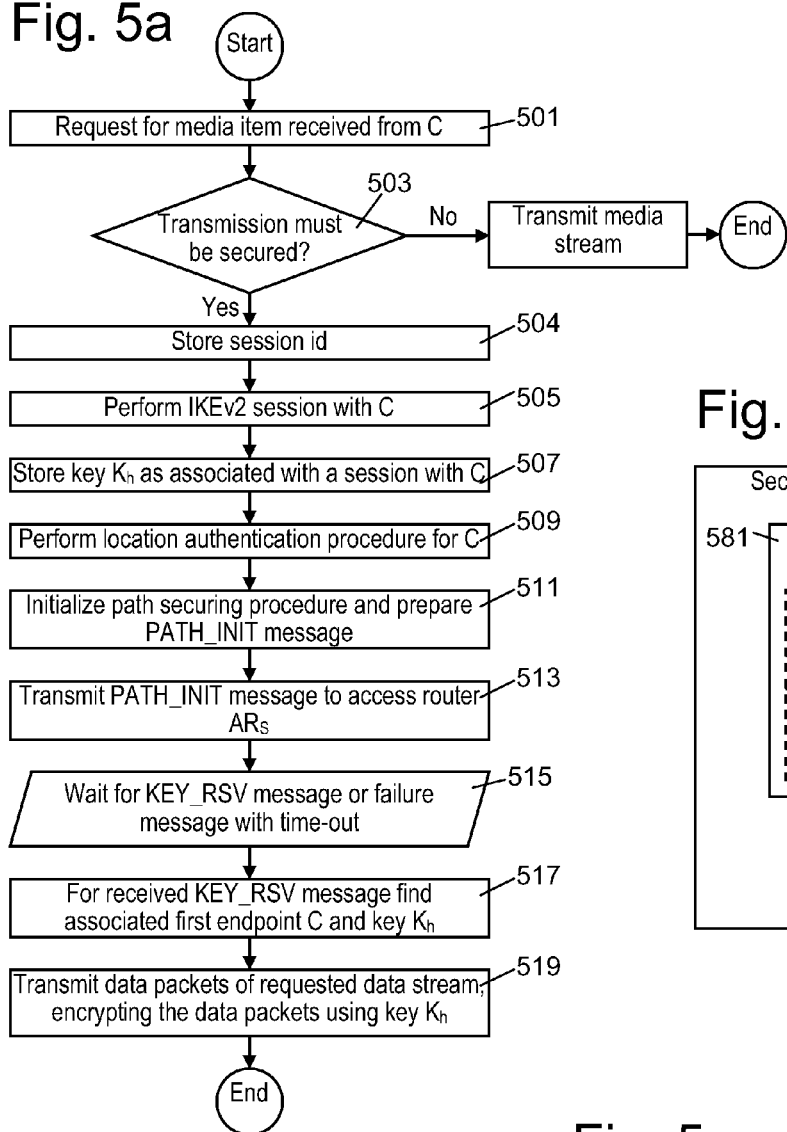
Fig. 5a
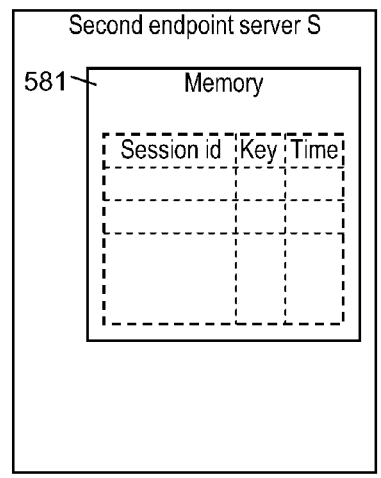
Fig. 5b
Fig. 5c
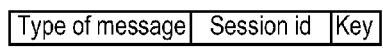

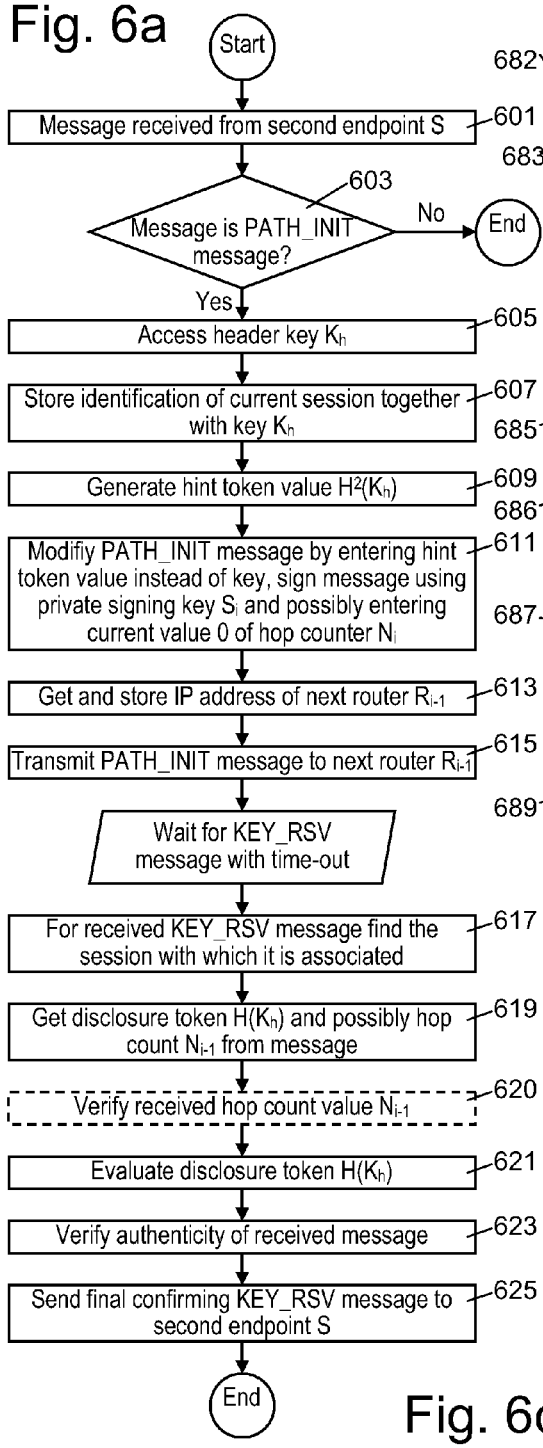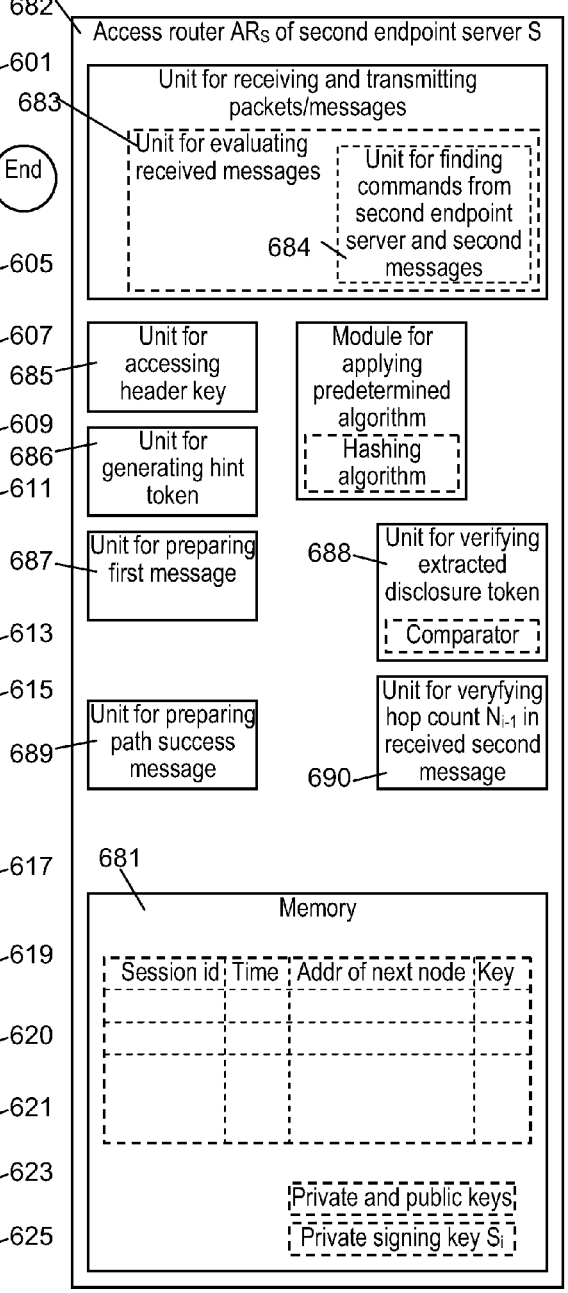

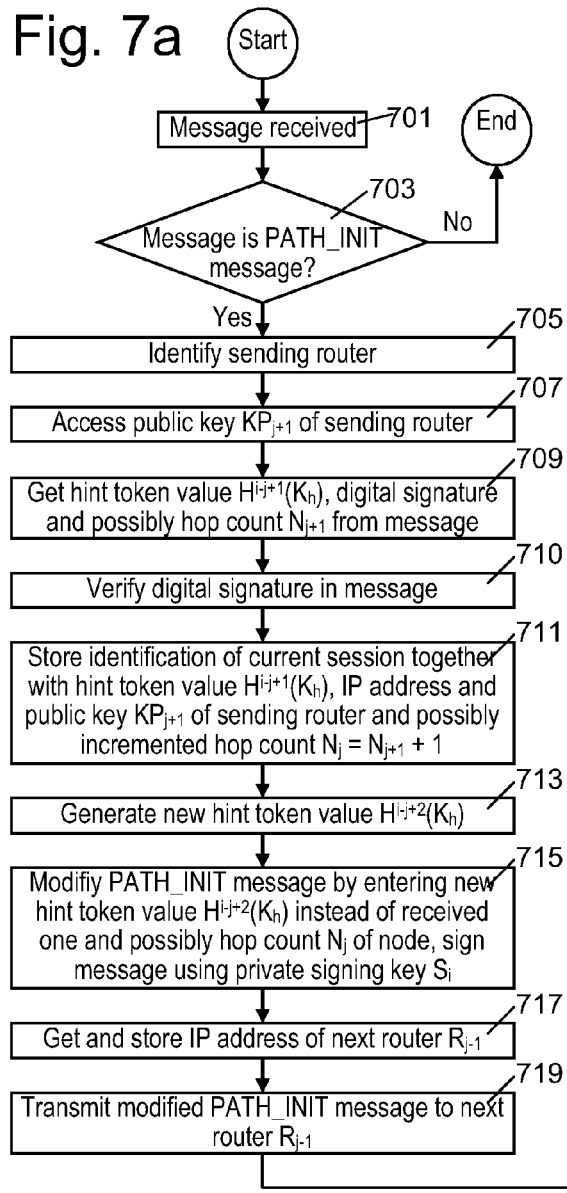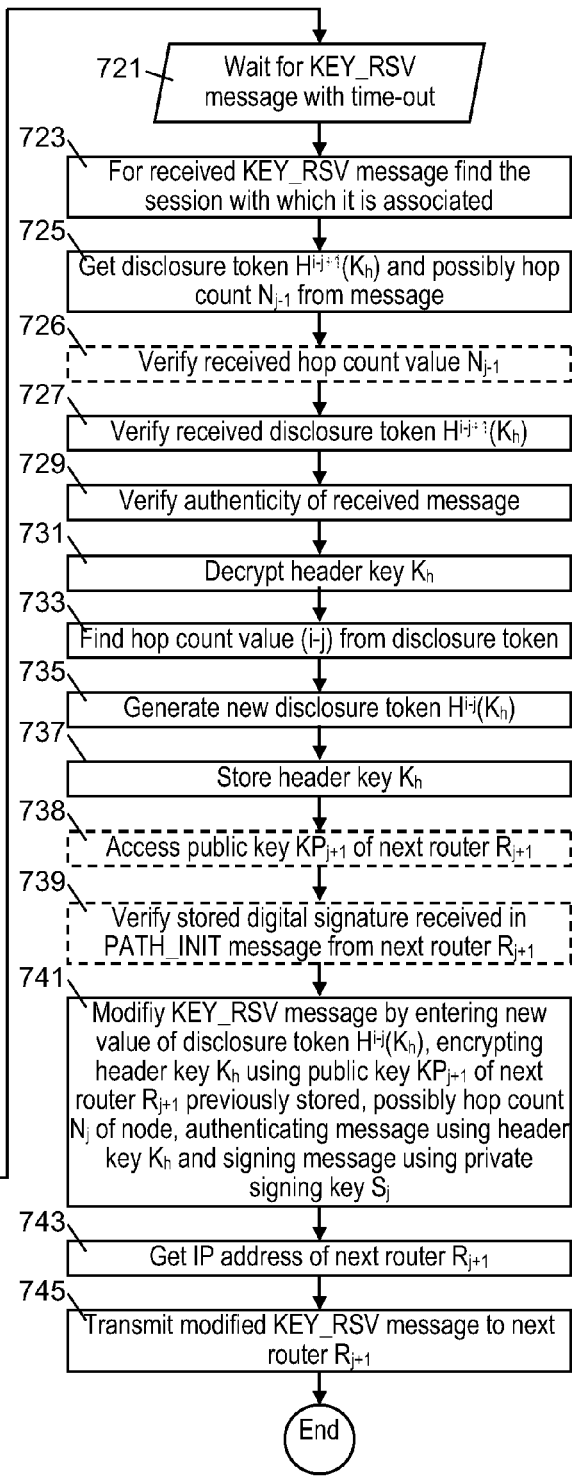

| Type of message | Session id | $N_j$ | $H^{i\text{-}j\text{+}1}(K_h)$ | $Sign(S_j: N_j, H^{i\text{-}j\text{+}1}(K_h))$ |

| Type of message | Session id | $N_j$ | $H^{i\text{-}j\text{-}1}(K_h)$ | $E(KP_{j+1}: N_j, K_h)$ | $M(K_h: N_j, H^{i\text{-}j\text{-}1}(K_h), E(KP_{j+1}: K_h))$ |

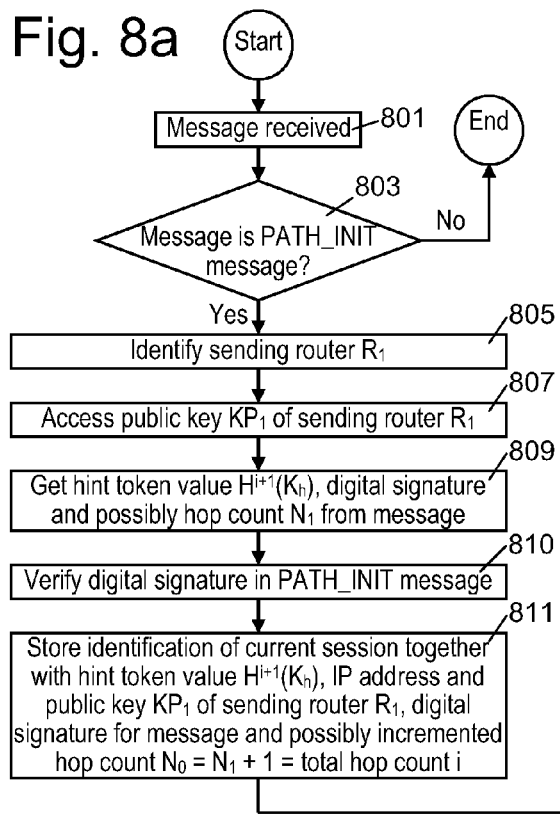
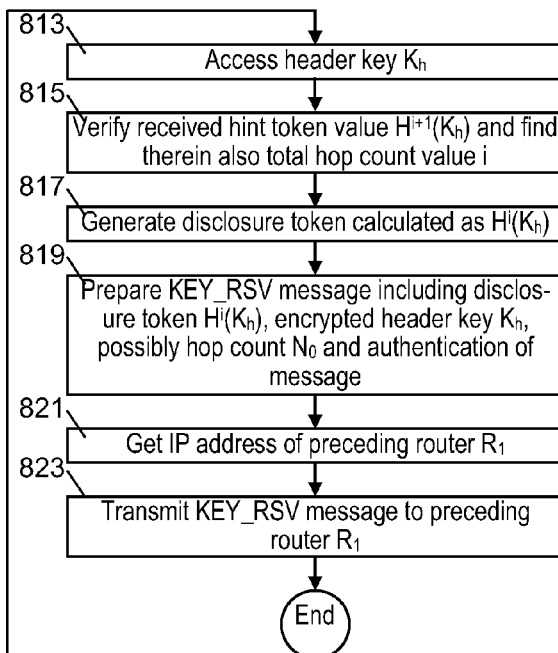
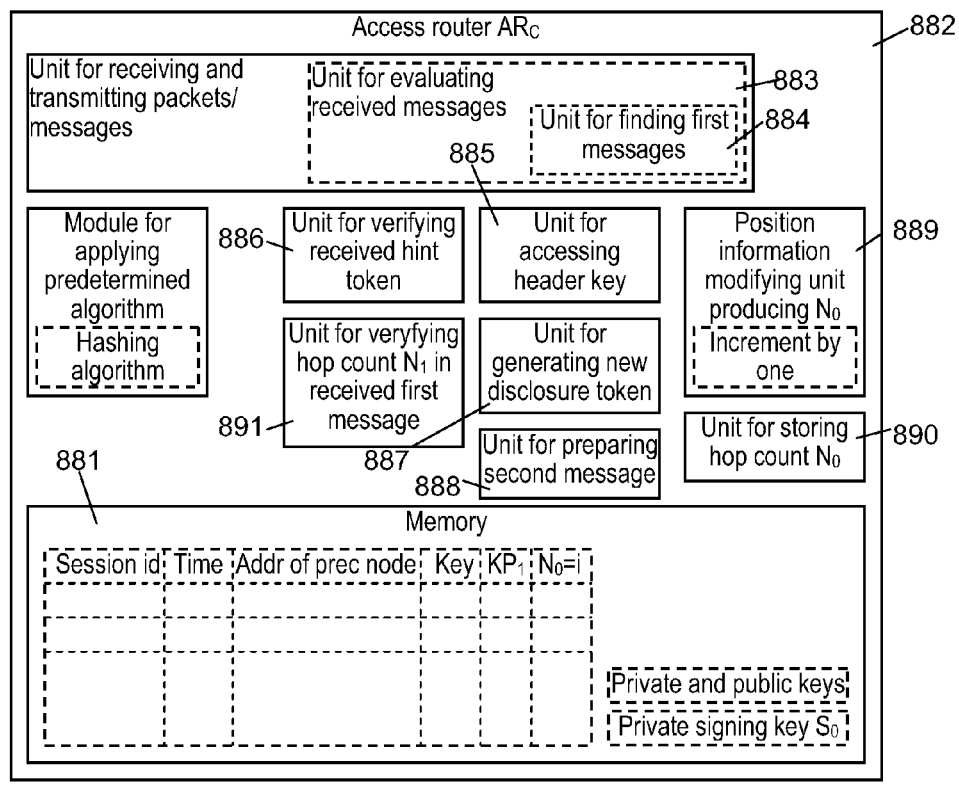

KEY DISTRIBUTION TO A SET OF ROUTERS

FIELD OF THE INVENTION

The present invention relates generally to security of transmission in networks and in particular to methods of distributing keys to stations or nodes such as routers connected in a path in a network between two endpoints and also to devices and arrangements used in the methods.

BACKGROUND

In data communication networks such as packet-switching networks the information transmitted between two nodes connected in or to the respective network is represented in digital form and is divided into packets. The information may in particular be transmitted between two endpoints or end nodes connected to the network. As illustrated in FIG. 1 a first end node C can communicate with a second end node S through the nodes of the network 1, the nodes of the network also called routers or switching nodes. Each of the end nodes accesses the network through an access node $AR_C$, $AR_S$. Between the access nodes the information transmitted between the end nodes C, S can propagate along different paths including various other network nodes. E.g. one path may be used for transmitting first information from the first end node to the second node and different path may be used for transmitting response information from the second end node to the first node. This is called asymmetric routing. In symmetric routing the packets instead flow forward and reverse down the same path between the two endpoints.

The endpoints or end nodes may for example be or include various electronic devices such as computers and mobile telephones. The packet-switching network 1 may in particular be the Internet or a similar network.

The communication between nodes is often performed according to a protocol that is a set of rules which may be standardized. For the Internet the communication is generally performed according to the Internet Protocol IP and specifically according to the current version thereof such as the IPv6, i.e. version 6 of the Internet protocol. The rules of a protocol for a packet switching network stipulate, among many things, which fields and extra information should be included in each packet, how packets are routed and how errors are detected and corrected. Asymmetric routing as mentioned above can occur in the large Internet backbone network since the path for forwarding information in a first direction between two endpoints may often be less available for forwarding information in a second, opposite direction between the two endpoints.

In order to keep the information content secret or confidential in the communication thereof between end nodes, the information can be encrypted using one or more encryption keys. E.g. when two end nodes, such as the end nodes C, S, are to establish a communication session in which an exchange of information will take place, they can exchange keys in a sequence of preliminary messages and for example generate a secret encryption key $K_S$ that is shared and known by only these two nodes. A protocol giving rules for performing exchange of keys can be called a key establishment protocol. A standard key establishment protocol is the IKEv2 (Internet Key Exchange version 2) protocol.

In order to perform the exchange of information between two end nodes, there may be special requirements for the communication. E.g., there may be requirements such as that no packet is allowed to be lost during the transmission thereof during the network 1, that the packets arrive to the destination end node in a correct sequential order and with a time interval between that is not too large, e.g. to allow real time streaming of data. Protocols that handle such requirements can be called QoS (Quality of Service) protocols.

However, allowing the use of both a QoS (Quality of Service) protocol and a security protocol such as an IP security (IPsec) protocol in the same communication session between two end nodes has always been a difficult challenge as the requirements for performing exchange of information according to the first protocol often contradict those dictated by the security protocol, see S. Kent, K. Seo, "Security Architecture for the Internet Protocol", IETF RFC 4301, December 2005. In fact, when an IPsec protocol is used, no router on the path between the two endpoints could be capable of providing the required QoS as all corresponding fields are encrypted. For example, on a local narrow-bandwidth link, it would be beneficial to perform transcoding of the data for more efficient bandwidth usage. This is made impossible in the case where the data is encrypted and/or integrity protected. Moreover, it may be difficult to stop "unwanted" traffic, e.g. "SPAM" or traffic forming part of an attempt to generally flood the network. This would typically require analysis of the packet content, which again is made impossible by encryption. Other security functions such as e.g. message authentication and integrity may similarly be in contradiction to QoS. It follows that enabling a satisfactory QoS imposes a limitation on the security/confidentiality scope, in order to enable specific routers to process and provide QoS requirements, or in general, for the routers to enforce some policy for how to handle the data. The main solution to this problem has been to design dedicated higher layer security protocols, which provide limited data confidentiality compared to what IPsec protocols can provide: the lower in the stack security is placed, the higher becomes its "coverage". For instance, if protection is applied at the transport level, through e.g. TLS, lower level network data, e.g. IP or MAC headers, will remain unprotected.

There is also a security problem when setting up a communication session as appears from the following example. The first end node C sends a request to the second end node S which may be e.g. a content server that the first end node, the client, wishes to establish a communication session, see FIG. 2. The second end node decides that the communication session must be protected by encryption and starts a key exchange procedure by sending some first message directed to the first end node. However, the second end node S has no way of knowing whether it is then actually conducting the key exchange with another node MiTM (Man-in-The-Middle) that is interposed along the path in the network 1 between the access routers $AR_C$, $AR_S$ of the end nodes. If this node MiTM involves itself in such a key exchange procedure, it would most likely be capable of intercepting the communication between the two end node and of decrypting information in the forwarded packets during the communication session. A security attack of this kind is called a Man-in-The-Middle attack.

Unicast reverse path forwarding (uRPF) as defined in RFC 3704 is a method that uses the routing tables of routers in a network in order to prevent IP address spoofing. Packets are only forwarded if they come from the best route of a router to the source of a packet and it is preferably used for symmetric routing.

It can also be mentioned that an ART (Address Reachability Test) is often performed in a standardized way in conjunction with the exchange of keys between end nodes, making each of the end nodes gain some assurance about the topological location of the other end node. However, such tests and similar procedures cannot protect against security attacks of the MiTM kind.

The MiTM problem is addressed in the Internet Draft haddad-sava-prefix-reachability-detection-00 having the title "Enabling Source Address Verification via Prefix Reachability Detection", submitted to the IETF on Jul. 7, 2007, found at e.g. the URL:s http://tools.ietf.org/pdf/draft-haddad-sava-prefix-reachability-detection-00.pdf and http://www.potaroo.net/ietf/idref/draft-haddad-sava-prefix-reachability-detection/. In the copending International patent application PCT/SE2008/050209, filed Feb. 26, 2008 a Prefix Reachability Detection (PRD) protocol is disclosed and a procedure performed according to this protocol allows a location-based authentication for a connection over e.g. the Internet between two endpoints such as a client and a server. In particular, a source address verification mechanism is disclosed, which can also be used in a mobile and multihomed environment. The disclosed method allows a first endpoint to check the topological location of a second endpoint, in the sense that the first endpoint can determine whether the topological location of the second endpoint topological location in the network correctly corresponds to the prefix claimed by the second endpoint in its IP address. Such a procedure is also called "location authentication".

The use of the Prefix Reachability Detection protocol can thus allow protection against man-in-the middle attacks. Performing a successful PRD procedure can provide sufficient assurance to the two endpoints C and S in regard of the claimed topological location of the other endpoint, which helps building trust between the two endpoints. In a procedure according to the PRD protocol it is assumed that each node connected in the considered network is capable of securely fetching the public key (Kp) of another node connected in the considered network, e.g. by performing a prefix lookup, the prefix being the first portion of an Internet address.

SUMMARY

It is an object of the invention to provide a method, a system and devices therein that allow communication of data between two endpoints with simultaneously a relatively high degree of security and a relatively high quality of service.

Thus generally, in a method and a system for communicating information/data between two endpoints connected to a network a secure and confidential distribution of a special key is performed. This is allowed by performing a "path handshake" in order to make sure that only nodes on one particular path will receive the special key or information related thereto.

The fact that only said node on the single particular path knows the special key can allow a high quality of service. Generally, QoS protocols can take advantage from running e.g. IPsec protocols between the two endpoints without requiring additional higher layer security protocols, i.e. with restricted scope, in order to enable both of the two endpoints to enjoy QoS features.

It can be made sure that nodes located on the particular path will not waste processing power in decrypting fake keys and/or validating public key signatures. This is achieved by postponing complicated public key operations until the nodes have already achieved some degree of assurance on the authenticity of messages. The existence of trustable nodes between access nodes at the two endpoints is verified.

In the "path handshake" procedure, a first message is forwarded in one direction along a path between two endpoints and a second message is thereafter forwarded in the opposite direction along the same path. These messages carry special information that is used in the nodes along the path for checking purposes. Such special information can be stored in the nodes when receiving the first message and then, when receiving the second message, the special information therein can be matched against the stored special information. The special information in the first and second messages can be modified in each node, such a by applying a suitably chosen algorithm. As the algorithm, a hashing function can be used that in the forwarding of the first message is applied in each of the nodes to some basic cryptographic information to produce the special information. In the return flow, i.e. in the second message, the basic cryptographic information can be distributed to the nodes along the path and the hashing function is applied thereto a number of times that is derived from or corresponds to the position of the node along the path. By verifying the special information in the second message produced in the way against the special information already stored in the node, as obtained from the first message, assurance on the authenticity of neighbouring nodes and also information about the position of the node along the path can be obtained.

Generally, a communication session is to be established between two endpoints, a first endpoint and a second endpoint, which are connected to a packet-switching network that may be an IP network and comprises a plurality of nodes. In a method and system for transmitting session information, associated with the establishing of the communication session and before actually starting the communication session, steps can be performed for setting up a secure path between the two endpoints. For example, two basic steps may include:

Transmitting a first message in a first direction between the two endpoints along a path including nodes of the network, the path starting at a node directly connected to one of the two endpoints and ending at a node directly connected to another of the two endpoints and the path being chosen in some suitable way such as being established according to a suitable routing protocol, the first message carrying a specially selected piece of information called first special information or a hint token, the hint token being stored in each of the nodes along the path.

Transmitting, from the node that is directly connected to said another of the two endpoints, a second message along the same path in a second direction opposite the first direction, the second message also carrying a specially selected piece of information called second special information or a disclosure token, and information about or based on a cryptographic key known to the two endpoints, where this cryptographic information is to be used for transmission of the session information, i.e. for forwarding data such as data packets in the session to be established. Each of the nodes along the path, except the node that is directly connected to said another of the two endpoints, is arranged to compare, after having received the second message, the disclosure token carried in the received second message to the hint token stored in the node and hence performing a verification of the second message. Each of the nodes along the path is also arranged to store the cryptographic information carried in the received second message.

Alternatively, the two basic steps may instead include, e.g. in the case where it cannot easily be arranged or assumed that the second message transmitted in the opposite direction takes the same path as that used for the first message:

Transmitting a first message in a first direction between the two endpoints along a path including nodes of the network, the path starting at a node directly connected to one of the two endpoints and ending at a node directly connected to another of the two endpoints and the path being chosen in some suitable way such as being established according to a suitable routing protocol. Each of the nodes along the path, except the node that is directly connected to said one of the two endpoints, is arranged to store an address of the node from which it obtained the first message.

Transmitting, by using the stored addresses, a second message along the same path in a second direction opposite the first direction and starting at the node that is directly connected to said another of the two endpoints, the second message carrying information about a cryptographic key known to the two endpoints to be used for transmission of the session information, i.e. for forwarding data such as data packets in the session to be established. Each of the nodes along the path is arranged to store the cryptographic information carried in the second message, either by extracting from the received second message or by obtaining it in some other way, the latter case being valid for the node which is directly connected to said another of the two endpoints and at which the transmission of the second message starts.

The first message may then carry the hint token and the second message the disclosure token and a comparing operation be performed for verifying the second message, as defined in the two basic steps first recited above.

Each of the nodes along the path can store an address of the node to which it transmits the first message in order to allow that the second message is certainly transmitted along the same path as the first message.

Furthermore, in order to increase the security, the first and second messages may be stepwise changed or transformed when transmitted along the path, e.g. by using the following procedure:

At least some of the content of the first message is modified in each of the nodes along the path, except in the node that is directly connected to said another of the two endpoints and except in the node that is directly connected to said one of the two endpoints before the first message is transmitted to the next node in the first direction along the path. In particular the hint token carried in the first message may be changed or modified.

At least some of the content of the second message is modified in each of the nodes along the path, except in the node that is directly connected to said another of the two endpoints and in the said node that is directly connected to said one of the two endpoints before the second message is transmitted to the next node in the second direction along the path. In particular the disclosure token carried in the second message may be changed or modified, this being performed if the hint token is changed or modified as mentioned above.

The hint token and the disclosure token may be obtained and modified by using some transforming information that is known to the two endpoints. For example, the cryptographic key or some other suitable information based thereupon can be used in a predetermined algorithm in an iterative or repeated manner. The predetermined algorithm may be a hashing function, e.g. of some standard type.

In the method and system as briefly described above, an access node may be used that is arranged for connection to or that is connectable to said first one of two endpoints. The access node is then arranged for generating and processing the first and second messages. It can then comprise a unit for accessing or generating the first special information, i.e. the hint token, and another unit for preparing the first message. The latter unit is then suitably arranged to insert the accessed or generated hint token in the first message. The access node is arranged to transmit, when it is connected to the packet-switching network, in the first direction towards said second one of the two endpoints, the prepared first message to a first node connected in the packet-switching network. Furthermore, the access node is arranged to extract, when connected to the packet-switching network and when it receives from a node connected in the packet-switching network the second message, the disclosure token carried in the received second message. The access node also comprises a verifying unit for verifying the extracted disclosure token against the previously accessed or generated hint token such as by performing a comparing operation in a comparator. The access node can then be arranged to signal the result of the verifying operation, at least in the case where the result of the verifying is positive, this being the last step in establishing the secure path. In particular the result can be signalled to said first one of the two endpoints such as by transmitting a message indicating the result.

The unit for accessing or generating the first special information may then be arranged to generate the hint token by modifying or transforming a cryptographic key according to a predetermined algorithm that can be a hashing algorithm, e.g. according to some standard. Furthermore, the access node can be arranged to store address information of the first node, to which the prepared first message is transmitted.

The access node can be arranged to also prepare and process position information in the first and/or second special messages, such position information indicating the position, such as order number or sequential number, of the access node along the path in the process of being established/having been established. Then, the unit for preparing the first message is arranged to include in the first message position information indicating that the first message is to be transmitted to the first node along the path or that the first message comes directly from the access node that starts establishing the secure path. In this case, the access node may also be arranged to extract, when receiving the second message, position information indicating the sequential position of the node, from which the second message is received, along the path. Accordingly, the access node can then comprise a position verifying unit for verifying that the position information in the received second message which indicates the sequential position actually indicates that the node, from which the second message is received, is the first node along the path.

In the method and system as briefly described above, a node for the packet-switching network may be used that is arranged for forwarding information between any two endpoints, between which communication sessions through nodes in the packet-switching network can be established. Such a node may then be arranged to process the first and second messages. In particular, it can extract the hint token carried in a received second message and also store the hint token in a memory of the node. The node may further comprise a unit for modifying or transforming the hint token according to a predetermined algorithm, such as a hashing algorithm. It can also comprise a unit that is arranged to modify the first message and then to insert the modified or transformed hint token in the first message instead of the hint token carried in the received first message. The node is then arranged to transmit in the first direction towards the second one of the two endpoints the prepared first message to a first other node connected in the packet-switching network. When the nodes receives from a second other node, that is also connected in the packet-switching network, the second message it can extract the disclosure token. A verifying unit in the node is arranged to verify the disclosure token carried in the received second message against the hint token stored in the node such as by a comparing operation. The node also comprises a unit for generating a new disclosure token using a predetermined algorithm, such as an algorithm that includes a hashing function. A unit in the node for modifying the second message is arranged to insert the generated new disclosure token in the received second message instead of the disclosure token carried therein. Finally, the node is arranged to transmit in the second direction towards the first one of the two endpoints the modified second message.

The node can also be arranged to extract a cryptographic key from the second message and to store the cryptographic key in the memory of the node. The stored cryptographic key can be used in the node for cryptographic processing, such as for encrypting and/or decrypting, of messages exchanged between the first and second endpoints as part of a communication session established between them. The unit for generating a new disclosure token may then be arranged to apply the predetermined algorithm to the cryptographic key carried in the second message in generating the disclosure token. In particular, it may be arranged to apply a hashing algorithm to the cryptographic key a number of times that is based on the sequential place of the node in the chain of nodes along the path.

If suitable, the node may also, such when symmetric routing is not used, in receiving the first message, address information of the node, from which the first message is or was received. In the same way the node may store, in transmitting the modified first message, address information of the first other node, to which the modified first message is transmitted.

The node can in the same as for access node described above be arranged to also prepare and process position information in the first and/or second special messages. The position information then indicates the position, such as order number or sequential number, of the node along the path that is in the process of being established/has been established. Then, the node may extract from a received first message position information that indicates the sequential position of the node, from which the first message is or was received. The node may further comprise a position information modifying unit arranged to modify said position information of the sequential position to instead indicate the sequential position of the node itself such as by incrementing a received position number by one. Then, the modified position information can be stored and/or the unit for modifying the first message can be arranged to include the modified position information in the first message that is to be transmitted from the node. In the same way, the node may extract, when it receives the second message from a node connected in the packet-switching network, position information indicating the sequential position of the node, from which the second message is or was received. Then, the node may comprise a position verifying unit for verifying the extracted position information against the position information stored in the node itself. For example, this may be done by reducing a received position number by one and then comparing the reduced position number to the position number stored in the node. The unit for modifying the second message may include the position information stored in the node in the second message.

In the method and system as briefly described above, another access node may be used that is arranged for connection to or that is connectable to the second one of two endpoints. Also, this access node is arranged for generating and processing the first and second messages. In particular, it can extract the disclosure token carried in a received second message and also verify it, this e.g. being performed in a verifying unit. The access node can comprise a unit for accessing or generating the second special information, i.e. the disclosure token, and a unit for preparing the second message, this latter unit arranged to insert the accessed or generated disclosure token in the second message. Finally, the node is arranged to transmit in the second direction towards the first one of the two endpoints the prepared second message to a node connected in the packet-switching network. The unit for preparing the second message may be arranged to insert also a cryptographic key in the second message.

The unit for generating a disclosure token in the access node may apply a predetermined algorithm to a cryptographic key, such as applying a hashing algorithm to the cryptographic key a number of times based on the sequential place of the access node in the path along which the first message has been transmitted.

If suitable, such as in the case where symmetric routing is not used, the access node may store, when receiving the first message, address information of the node, from which the first message is or was received.

The access node can be arranged to also prepare and process position information in the first and/or second special messages, such position information indicating the position, such as order number or sequential number, of the access node along the path in the process of being established/having been established. Then, the access node may extract, when it receives the first message from a node connected in the packet-switching network, position information indicating the sequential position of the node, from which the first message is received, along the path. The access node can comprise a position modifying circuit arranged to modify the received position information to instead indicate the sequential position of the access node itself along the path, such as by incrementing a received position number by one, and to store the modified position information. The unit for preparing the second message can then accordingly include the position information stored in the access node in the second message.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

FIG. 5a is a flow chart of steps performed in a second one of two endpoints, FIG. 5b is a schematic of the second endpoint illustrating fields in the memory thereof, FIG. 5c is a view illustrating fields in a message prepared and transmitted by the second endpoint, FIG. 6a is a flow chart of steps performed in an access router of the second endpoint, FIG. 6b is a schematic of the access router of the second endpoint illustrating fields in the memory thereof, FIG. 6c is a view illustrating fields in a message prepared and transmitted by the access router of the second endpoint, FIG. 7a is a flow chart of steps performed in an intermediate router, FIG. 8a is a flow chart of steps performed in an access router of a first of two endpoints, FIG. 8b is a schematic of the access router of the first endpoint illustrating fields in the memory thereof, and FIG. 8c is a view illustrating fields in a message prepared and transmitted by the access router of the first endpoint.

DETAILED DESCRIPTION

Figure 1:
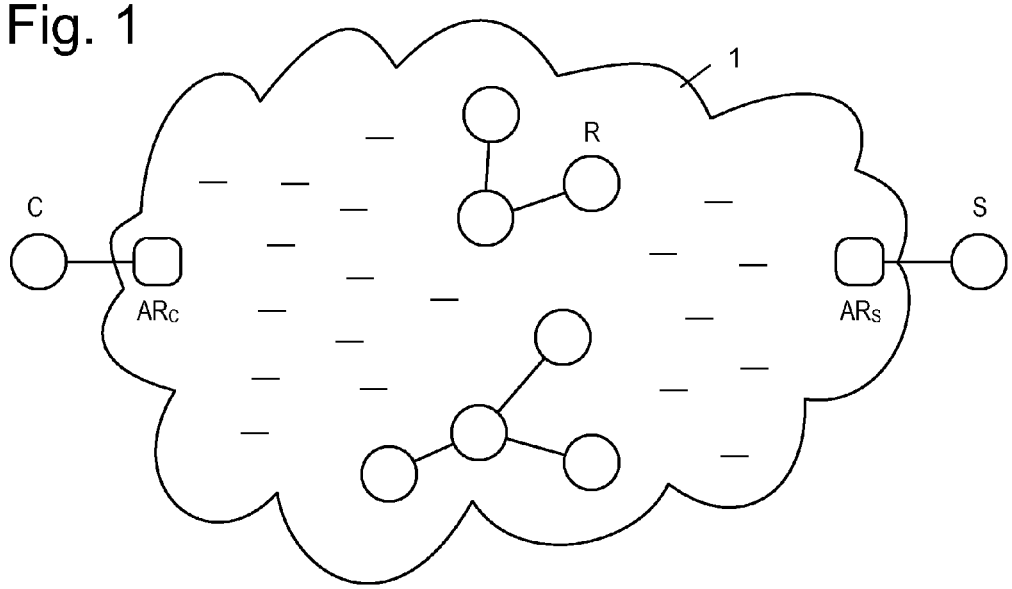
FIG. 1 is a schematic of two endpoints connected to each other through access routers in a network.
Figure 2:
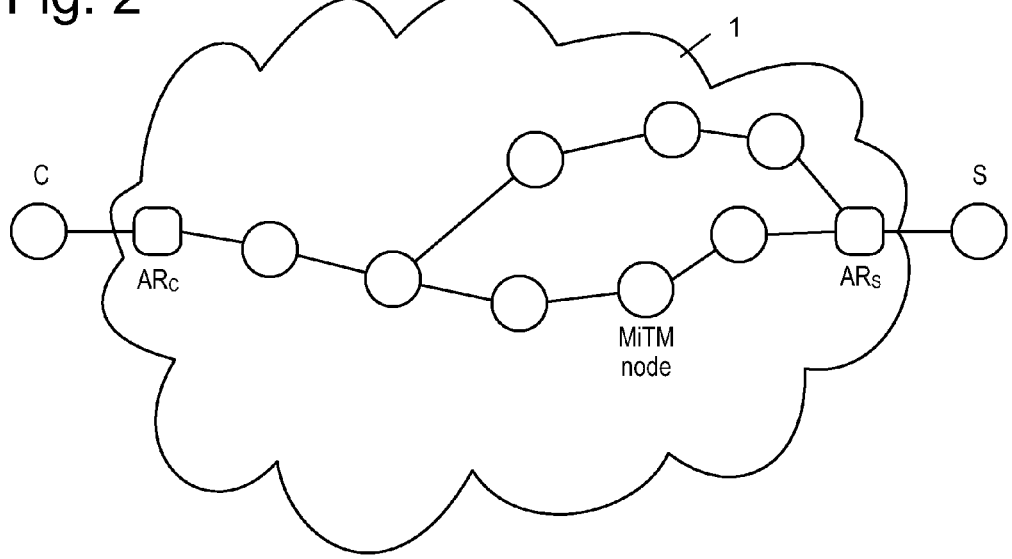
FIG. 2 is similar to FIG. 1 illustrating different paths through the network.

A method and system for generally establishing a path in a packet-switching network, e.g. an IP network such as the Internet, will now be described. The packet-switching network can generally comprise a plurality of nodes, in particular routers, and access nodes connected to endpoints. In the network a communication session for transmitting session information can be established between two of the endpoints. A certificate can be assigned to each node such as according to some standard public key infrastructure. For instance, an operator of the network may maintain an X.509 Certificate Authority (CA) which manages/issues public keys and certificates for/to the nodes in the network.

Procedures such as a procedure performed according to the Prefix Reachability Detection protocol discussed above allow a location-based authentication for a connection over an IP network between two endpoints, typically between a client and a server, the server e.g. containing information that can be of interest to the client. In particular, a source address verification mechanism is executed. The procedure allows one of the two endpoints to check the topological location of the other of the two endpoints, which maps correctly to the prefix claimed in their IP address. Such a procedure is also referred to as "location authentication".

In the method and system to be described a secure and confidential distribution of a special key, e.g. derived from running the IKEv2 (Internet Key Exchange version 2) protocol, see C. Kaufman, "Internet Key Exchange (IKEv2) Protocol", IETF RFC 4306, December 2005, or the HIP (Host Identity Protocol), see R. Moskowitz, P. Nikander, P. Jokela, T. Henderson, "Host Identity Protocol", IETF draft-ietf-hip-base-08, June 2007, to a set of routers or other similar intermediate stations located on a path between two endpoints is allowed. This special key can then be used in a session where useful or payload information, "session information", e.g. streaming data, is transmitted between the two endpoints, thus allowing a high QoS. Such a special key can for example be used to encrypt the header and/or the payload of data packets carrying the session information and intermediate routers or nodes can use the special key to gain local access to message content for QoS purposes. After creating the special key shared by the endpoints first a procedure using the Prefix Reachability Detection protocol mentioned above or some similar procedure/protocol may be performed, if desired. In fact, performing a successful PRD procedure provides sufficient security to the two endpoints C and S in regard of the claimed topological location of the other endpoint, which helps building trust between the two endpoints prior to discussing QoS features. Note that it is always assumed, as in the PRD protocol, that each node, router or station in the network is capable of securely fetching the public key $K_p$ of another node, router or station in the network, e.g. by performing a prefix lookup.

The nodes, routers or stations in the network are modified so that, in the cache memory of each of the on-path nodes etc., a "hint" derived from the special key and the IPv6 (Internet Protocol version 6) address of the previous hop are stored. Also more data can be stored during execution of the process, such as the IP address of a next node, the value of a hop counter, a hash of the special key, etc.

The method involves a multitude of steps and first it will be generally described. Two endpoints, a first endpoint or client C and a second endpoint or server S, are interconnected by a set of routers, including the access $AR_C$ router of C, also identified as an initial router $R_0$, intermediate or inner routers or nodes $R_1, R_2, \ldots, R_{i-1}$, and finally the access router $AR_S$ of the second endpoint S, also identified as the final router $R_i$.

First, the two endpoints C and S establish a shared header key $K_h$, i.e. generally some shared secret information that is to be used in encryption/decryption, e.g. by performing a procedure using the IKEv2 protocol as discussed above. This key can in some cases be shared with the access routers $AR_s$ and $AR_c$ assuming they are trusted, see the discussion below. Since it will simplify the description, it is for now assumed that the header key $K_h$ is also shared with the respective access routers. The goal of the procedure is to establish a common key in all routers on the path. In the general case, this router-key, denoted $R_k$, can be a hashed copy of the shared key $K_h$, i.e. $R_k=H(K_h)$, where H is a predetermined one way hash function known to all nodes of the network 1. However, to simplify the description, it is initially assumed that $R_k=K_h$. The same key $R_k$ is of course also known to the two end-points S and C.

The method includes two "token-passing" phases between the two endpoints S and C, via the routers $R_0, R_1, \ldots R_i$. In a first, "leftbound-phase", herein called PATH_INIT, the second endpoint S initiates the propagation of a so-called hint token which generally is some appropriately selected first special information. In this embodiment, this hint token initially equals $K_h$, and each on-path router will hash it using the one-way hash function H, before passing it on to its left neighbour. That is, an inner router $R_j$, j=1, 2, ..., i−1, receives a hint token called x from its right neighbour $R_{j+1}$. This hint token x is $K_h$, hashed one or more times. The inner router $R_j$ stores this hint token for later use, and passes on a hashed hint token y=H(x) to the left/preceding node $R_{j-1}$, along the path. By the properties of the hash function H, the inner router $R_{j-1}$, will know y, but not (yet) x. Eventually, a hint-token reaches the access router $AR_C$ (=$R_0$) of the first endpoint C. This access router $AR_C$, which is assumed to already know the header key $K_h$, checks that the header key $K_h$, hashed an appropriate number of times, gives or agrees with the received hint token. This process is simplified if the routers also maintain a hop-count, see the discussion below.

If agreement is obtained, the access router $AR_C$ accepts and initiates the second "right-bound" phase, denoted KEY_RSV herein. In this phase a "disclosure token", which generally is some appropriately selected second special information that is related to the aforementioned hint-token, is propagated along the same path, but in the reverse direction. Specifically, the access router $AR_C$ starts the propagation of $K_h$ to the right via next router $R_1$ along the path. Each router $R_1, R_2, \ldots, R_i$ receive the disclosure token from its left neighbour. Each router $R_j$ of these routers verifies that the disclosure token matches, e.g. equals, its previously stored hint-token. If the verification is positive, the router passes a modified disclosure token on to the next router $R_{j+1}$. The header key $K_h$ is also propagated and stored in the nodes in this phase.

Any standard routing protocol may be assumed to be used in the first phase when a router $R_j$ selects the next-hop router $R_{j-1}$, e.g. a protocol using standard routing tables.

The purpose of the procedure is for the routers to verify that the tokens have indeed passed all the way between the two endpoints and reached the access routers $AR_C$ and $AR_S$ of the two endpoints, and that it can be presumed that the left/right neighbour is indeed the legitimate next-hop neighbour for nodes on the path between the two endpoints S and C.

To make the protocol entirely secure, also signatures and encryption must be used, as will be described in more detail below.

If it is desired not to disclose the key $K_h$ to the on-path routers and instead the hashed header key $R_k=H(K_h)$ the procedure is the same, except that the access router $AR_C$ of the first end-point applies the hashing function H to the header key $K_h$ once before starting the second phase, as will be discussed below.

H denotes a secure cryptographic hash function, e.g. SHA256. $H^n(x)$ denotes the hash function H applied iteratively n times to x, i.e. $H(H(\ldots H(x) \ldots))$. Sign denotes a secure signature scheme based on e.g. the RSA (Ronald Rivest, Adi Shamir and Leonard Adleman) algorithm, the signature key of a router $R_j$ is denoted $S_j$, E a secure public key encryption algorithm, which may also be the RSA algorithm and the public key of a router $R_j$ is denoted $KP_j$. Finally, M denotes a secure message authentication function, e.g. HMAC.

A complete procedure for setting up and using a connection between two endpoints in a general purpose network such as an IP-network or the Internet will now be described. It may in a first embodiment, where it is assumed that the access routers $AR_C$, $AR_S$ are trusted and can be given copies of secrets shared by the two endpoints, include the following steps:

1. A first endpoint, a client C, is connected to a network 1, in this example an IP-network such as the Internet, at its access router $AR_C$. The first endpoint starts to communicate with a second endpoint, a server S, over the network by sending address information related to the second endpoint, such as the URL of a home-page stored at the second endpoint or possibly the IP-address thereof, to its access router $AR_C$. The second endpoint S responds by sending its homepage to the first endpoint C. The first endpoint then in turn normally sends a message requesting some special service from the second endpoint, e.g. ordering content such as music available for purchase and displayed in a list on the homepage.

2. The second endpoint S receives the request, see block 501 in FIG. 5*a*.

3. The second endpoint S decides that the session to be performed requires a high degree of security and quality of service, see block 503.

4. The second endpoint S stores some indication that a special session will be performed and an identity thereof in its memory 581, see block 504 and also FIG. 5*b*.

5. The second endpoint S starts establishing and executing a session for exchanging keys, such as an IKEv2 session with the first endpoint C. In the IKEv2 session the IKEv2 protocol is used to derive an encryption key $K_h$ to be used for e.g. encrypting headers and/or payloads of data packets and called a "header key", see block 505, this key thus being shared by the two endpoints C, S and stored in respective memories thereof, compare block 507.

6. A procedure for location authentication of the first endpoint C may now be performed by the second endpoint S, if desired or suitable, such as a Prefix Reachability Detection (PRD) session using the PRD protocol, see block 509. This procedure is not necessary but may increase the security. It may also imply that the header key $K_h$ will be shared with the respective access routers.

In the following steps a procedure is performed in which all the intermediate routers $R_1, R_2, \ldots, R_{i-1}$ on a path in the network 1 between the two access routers $AR_C$, $AR_S$ will obtain, in a secure and confidential way, a copy of the header key $K_h$. The path includes a chain of totally (i+1) routers given numbers or indices starting at the access router $AR_C$ of the first endpoint which is also denoted the first hop router $R_0$, through (i−1) intermediate routers $R_1, R_2, \ldots R_{i-1}$ and ending at the last hop router $R_i$ that is the access router $AR_S$ of the second endpoint S. The steps will be described with reference to FIGS. 5*a*-8*c*. In the following it is assumed that the procedure is initiated by the second endpoint S, but as can be easily seen, a "mirrored" procedure, initiated by the first endpoint C, could just as well be executed.

7. The second endpoint S prepares a special hop-by-hop message, called a PATH_INIT message, see block 511. The message carries some identification of the session to be performed, e.g. a 32-bit number or some data including address information of the source of the message, i.e. the second endpoint, of the destination which is the first endpoint C and a port number of the port used for the session by the second endpoint. The message can also carry the header key $K_h$, if it has not previously been sent to the access router $AR_S$ as part of the PRD in step 6.

8. The prepared message is forwarded to the access router $AR_S$ of the second endpoint S, see block 513.

9. The message is received by the access router $AR_S$, see block 601 of FIG. 6*a*, is recognized, e.g. by a unit 684 incorporated in an evaluation unit 683, in turn included in a receiving and transmitting unit 682, see FIG. 6*b*, as a PATH_INIT message, see block 603, that requires special handling and processing and it is also recognized as an initialization message since it is received from a "new" endpoint.

10. The access router $AR_S$ accesses the header key $K_h$, see block 605. It can be performed by a unit 685.

11. The access router $AR_S$ sets some indication in its memory 681 that a PATH_INIT session is running together with information identifying the session, e.g. as suggested above a 32-bit number or the destination/source address pair and the port number, and possibly a time stamp, see block 607 and FIG. 6*b*. The access router stores, for the current session, the header key $K_h$ if it has not been previously stored.

12. In the access router $AR_S$ a hint token value $H^2(K_h)=H(H(K_h))$ is generated by hashing the header key twice, this hint token being the first value of a one-way hash chain (OWHC). The hash function H is as above a predetermined function known to all nodes of the network 1, see block 609. The generation of the hint token can be performed by a unit 686.

13. The received PATH_INIT message is modified by entering the hint token value therein and by signing the message using the digital signature scheme Sign and the secret signing key $S_i$ of the access router $AR_S=R_i$, see block 611. The modified PATH_INIT message is now also called a first special message, carrying first special information, i.e. the hint token, and it can be prepared in a unit 687. The modified message has at least two fields containing $H^2(K_h)$, and $Sign(S_i: H^2(K_h))$, see FIG. 6*c*.

14. The access router $AR_S$ finds the IPv6 address of the next router $R_{i-1}$, in the direction towards the first endpoint C using a suitable standard routing protocol and stores the found address, see block 613, this establishing the first hop or link of the path.

15. The signed PATH_INIT message is then forwarded to the neighbouring router along the first path, i.e. to the router $R_{i-1}$, see block 615.

16. Upon receiving the message, see block 701 of FIG. 7a, the router $R_{i-1}$ recognizes, e.g. by a unit 784 incorporated in an evaluation unit 783, in turn included in a receiving and transmitting unit 782, see FIG. 7b, the message as a PATH_INIT or first special message, see block 703, and also recognizes that it belongs to a new secure path establishing session.

17. The router $R_{i-1}$ identifies the sending router, see block 705, and accesses the public key $KP_i$ thereof, see block 707, obtains the hint token value $H^2(K_h)$ and the digital signature carried in the message, see block 709.

18. The router $R_{i-1}$ verifies the digital signature using the accessed public key $KP_i$, see block 710.

19. The router $R_{i-1}$ sets some indication in its memory 781 that a new PATH_INIT session is running together with information identifying the session. The router stores, for the current session, the obtained hint token value $H^2(K_h)$ together with the IPv6 address at suitable memory places in the router, see block 711 and FIG. 7b. The storing of the hint token can be performed by a unit 785. Optionally, the public key $KP_i$ of the sending router may also be stored.

20. The router $R_{i-1}$ generates in a suitable unit 786 a new hint token value $H^3(K_h)$ by hashing the hint token value $H^2(K_h)$ carried in the received message, see block 713.

21. The router $R_{i-1}$ prepares a modified PATH_INIT message by including the new hint token value instead of the former one and signing the message using the digital signature scheme Sign and the private key $S_{i-1}$ of the router $R_{i-1}$, see block 715. The modified message has at least two fields containing $H^{i-j+2}(K_h)$ and $Sign(S_j: H^{i-j+2}(K_h))$, where $S_j$ is the secret signing key of router $R_j$ and $j=i-1$ in this case, see FIG. 7c. The modifying of the first special message can be performed by a unit 787.

22. The router $R_{i-1}$ finds in the same way as the access router $AR_S$ the IPv6 address of the next router, in this case the router $R_{i-2}$, in the direction towards the first endpoint C and stores the found address in its memory 781, see block 717, this establishing the path.

23. The router $R_{i-1}$ forwards the modified PATH_INIT message to the next router $R_{i-2}$. see block 719.

Figure 3:
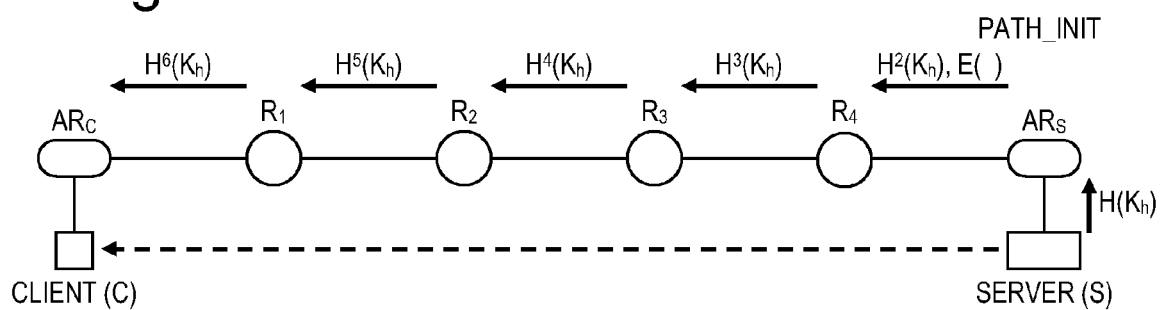
FIG. 3 is a schematic illustrating the propagation of a first message along a selected path between the endpoints.

24. Steps 17-22 are repeated for the next router $R_{i-2}$. and so on for all the inner routers of the first path in the direction towards the first endpoint C, the index value then taking values $j=(i-2), (i-3), \ldots 1$. The propagation of the PATH_INIT message thus continues on a hop-by-hop basis, the message being modified in each hop, until it reaches the access router $AR_C$ of the first endpoint C. This procedure is generally illustrated in FIG. 3, where, however, the case discussed below in which the access nodes only receive the hashed header key $H(K_h)$ is illustrated. Notice that during this procedure, although any router on the path can verify the authenticity of an incoming PATH_INIT message, each of the intermediate routers $R_2, R_3, \ldots, R_{i-1}$ has not yet authenticated the node on its left, i.e. the preceding node $R_{j-1}$ along the path, to which it passes the PATH_INIT message which has been modified in the respective router.

25. The PATH_INIT message is eventually received by the access router $AR_C$ of the first endpoint C, see block 801 of FIG. 8a, that recognizes, e.g. by a unit 884 incorporated in an evaluation unit 883, in turn included in a receiving and transmitting unit 882, see FIG. 8b, the message as a PATH_INIT message, see block 803, and also recognizes that it is itself the final router for the message by e.g. comparing the destination address, i.e. the address of the first endpoint C, to the addresses of client nodes to which it is currently connected.

26. The access router $AR_C$ identifies the sending router $R_1$, see block 805, and accesses the public key thereof, see block 807.

27. The access router $AR_C$ obtains the digital signature and the hint token value $H^{i+1}(K_h)$, consisting of the original key $K_h$, hashed (i+1) times, carried in the message, see block 809.

28. The access router $AR_C$ verifies the digital signature for the message, see block 810.

29. The access router $AR_C$ stores the hint token value $H^{i+1}(K_h)$, consisting of the original key $K_h$, hashed (i+1) times, carried in the received message together with the IPv6 address and possibly the public key of the sending router at suitable memory places in the access router, see block 811 and FIG. 8b.

30. Unless the header key $K_h$ is already known to $AR_C$ from step 6, the access router $AR_C$ of the first endpoint C accesses, e.g. by sending a request and then receiving, the header key $K_h$ from the second endpoint C, see block 813. This process can e.g. be performed by a unit 885.

31. The access router $AR_C$ uses the header key $K_h$, see block 813, to calculate hashed values $H^k(K_h)$, $k=1, 2, \ldots$ and compares the hashed values to the received hint token value $H^{i+1}(K_h)$. If an agreement is obtained for some value of k, the received hint token is verified and the total number of hops i is equal to this value of k reduced by one, i.e. $i=(k-1)$, see block 815. The verifying of the extracted hint token can e.g. be performed by a unit 886. The access router $AR_C$ records the success of the PATH_INIT procedure and that, from its point of view, the header key $K_h$ is now "activated" to be used for security purposes in communication between the two endpoints S and C, i.e. subsequent messages between S and C are assumed to be protected by the header $K_h$. If on the other hand the verification fails, an error procedure can be initiated as will be briefly discussed below.

32. The access router $AR_C$ generates in a unit 887 a disclosure token calculated as $H^i(K_h)$, see block 817.

33. The access router $AR_C$ prepares in a unit 888, using the header key $K_h$, a new hop-by-hop message called a KEY_RSV message or a second special message that is to be forwarded to the access router $AR_S$ of the other endpoint S. This second special message is provided with some information identifying the type of message and the session such as some address information of the two endpoints C, S. It further carries second special information, i.e. the disclosure token $H^i(K_h)$ and the header key $K_h$. The header key $K_h$ is encrypted using the public key encryption algorithm E and the public key $KP_1$, of the next router $R_1$ that has been obtained and stored in step 26. The KEY_RSV message is also authenticated with the header key $K_h$ and the secure message authentication function M, see block 819. The message thus has at least fields containing $H^i(K_h), E(KP_1: K_h),$ and $M(K_h: H^i(K_h), E(KP_1: K_h))$, where $KP_1$, is the public key of the next router $R_1$, see FIG. 8c.

34. The access router $AR_C$ retrieves from its memory the IPv6 address of the next router $R_1$ along the first path in the direction from the first endpoint C, which address has been previously stored in the router as described in step 27 above, see block 821.

35. The access router $AR_C$ forwards the KEY_RSV message to the next router $R_1$, see block 823.

36. Upon receiving the message, the router $R_1$ recognizes, as above e.g. in the unit 784, the message as a KEY_RSV message, compare block 721 of FIG. 7a, and identifies the path securing session with which it is associated, see block 723.

37. The router $R_1$ processes the message by e.g. first obtaining the disclosure token $H^{i-j+1}(K_h)$ from the message, see block 725. From its memory it retrieves the stored hint token value $H^{i-j+1}(K_h)$, where j=1 for the router $R_1$, and verifies in a unit 788 that the now received disclosure token agrees with the hint token stored, see block 727. Only if the result of the verification is positive, the router $R_1$ then verifies the authenticity of the received message, see block 729, and decrypts the header key $K_h$ using its own secret key, see block 731. Thus, the router does not "waste" expensive public key operations unless the verifying of the disclosure token gives a positive result, the verification obtained as a result of performing a simple comparison. As above, if the verification fails, an error procedure can executed, see the discussion below.

38. The router $R_1$ finds the hop count value (i−j) of the received disclosure token $H^{i-j+1}(K_h)$, where j=1 for the router $R_1$, by hashing the header key $K_h$ repeatedly or iteratively until there is agreement with the received disclosure token, see block 733.

39. The router $R_1$ generates in a unit 789 a new disclosure token $H^{i-j}(K_h)$, where j=1 for the router $R_1$, generally by hashing the header key $K_h$ (i−j) times and for the router $R_1$ by hashing it (i−1) times, see block 735.

40. The header key $K_h$ is stored in the router, see block 737, where this can be performed by a unit 790.

41. The router $R_1$ modifies in a unit 791 the second message by entering the new disclosure token $H^{i-j}(K_h)$, where j=1 for the router $R_1$, instead of the received one, encrypting the header key $K_h$ using the public key $KP_2$ of the next router $R_2$ that has been obtained and stored in step 10. The KEY_RSV message is authenticated with the header key $K_h$ using the authentication function M, see block 741. The resulting message then has at least fields containing $H^{i-j}(K_h)$, $E(KP_{j+1}: K_h)$ and $M(K_h: H^{i-j}(K_h), E(KP_{j+1}, K_h))$ where $KP_{j+1}$ is the public key of the next router $R_{j+1}$ as stored in step 10 and j=1 for the router $R_1$, see FIG. 7d

42. The router $R_1$ retrieves from its memory the IPv6 address of the next router $R_2$ along the first path in the direction from the first endpoint C, which address has been previously stored in the router as described in step 19 above, see block 743.

43. The router $R_1$ forwards the KEY_RSV message to the next router $R_2$, see block 745.

Figure 4:
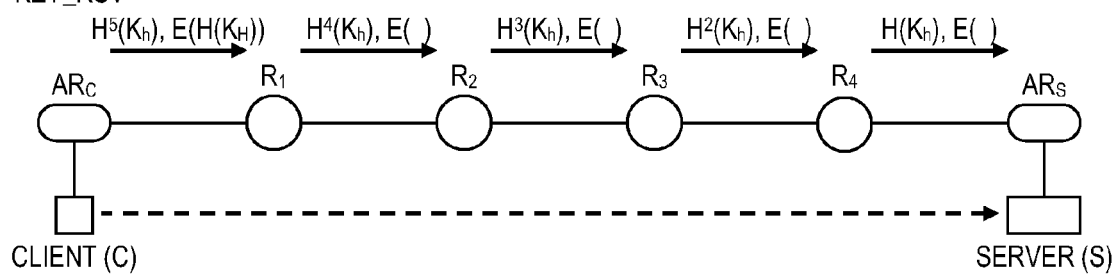
FIG. 4 is a schematic similar to FIG. 3 illustrating the propagation of a second message in an opposite direction along the selected path between the endpoints.
Figures 7B, 7C, 7D:
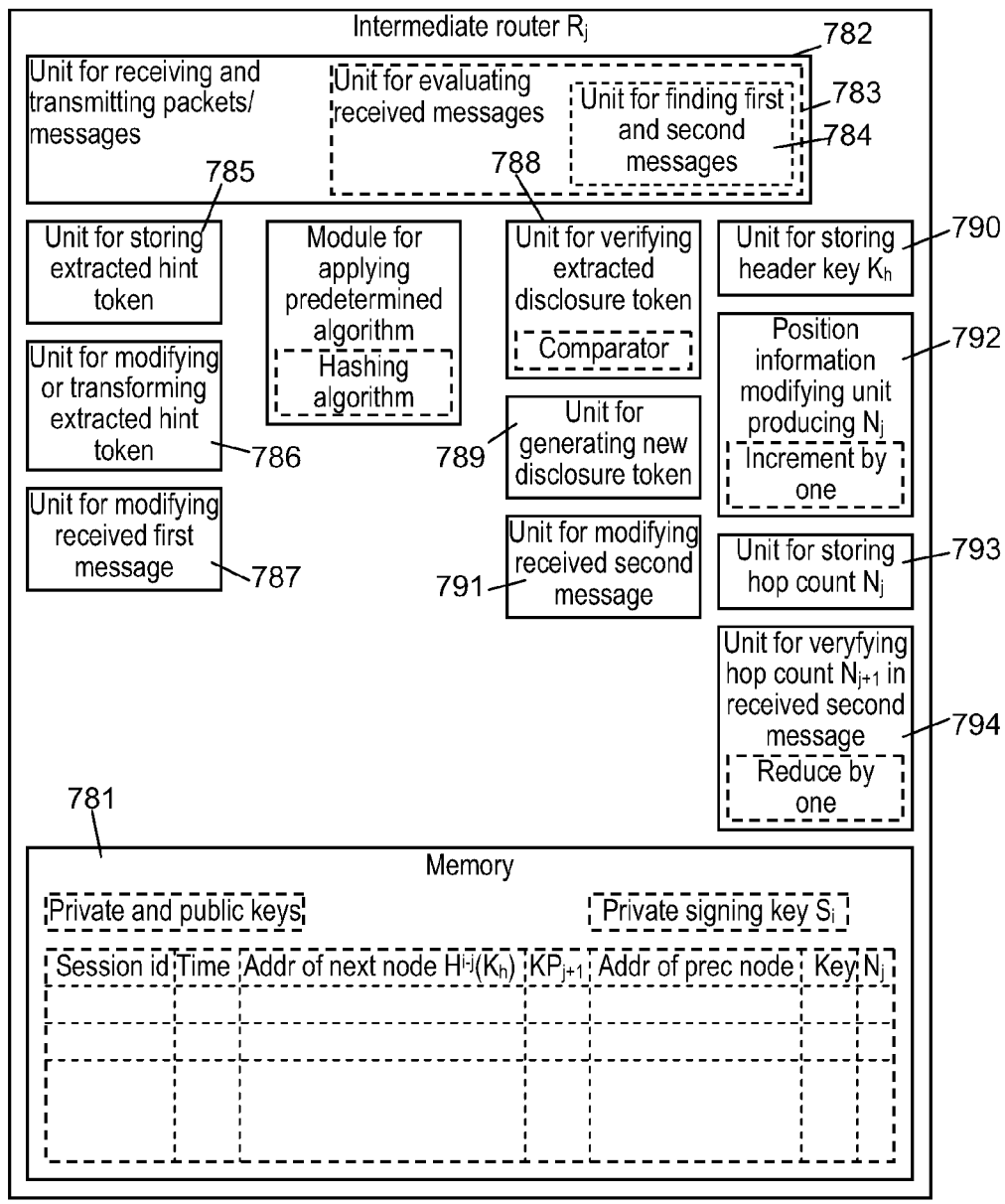
FIG. 7b is a schematic of the intermediate router illustrating fields in the memory thereof.
FIG. 7c is a view illustrating fields in a first message prepared and transmitted by the intermediate router.
FIG. 7d is a view illustrating fields in a second message prepared and transmitted by the intermediate router.

44. The steps 32-38 are repeated for all intermediate routers along the path, j then taking values 2, 3, . . . , i−1, i.e. for the same intermediate routers which have processed the PATH_INIT message until it reaches the access router $AR_S$ of the second endpoint S. This can be easily done as each router $R_2, R_3, \ldots, R_{i-1}$ has already stored the IPv6 address of the router from which it received the first special or PATH_INIT message. This type of "path handshaking" is needed in order to make sure that packets requiring special treatment will always follow the same path within the infrastructure and to avoid an unnecessary disruption/confusion of a router or routers, which do not belong to the set of routers through which the PATH_INIT message has passed. This procedure is generally illustrated in FIG. 4, where, as for FIG. 3, the case to be discussed below in which the access routers $AR_C$, $AR_S$ only receive the hashed header key $H(K_H)$ is illustrated.

45. Finally, the access router $AR_S$ of the second endpoint S receives the message, and recognizes it, e.g. in the unit 684 described above, as a KEY_RSV message, see block 617 of FIG. 6a.

46. The access router $AR_S$ processes the message by first obtaining the disclosure token $H(K_h)$ from the message, see block 619, and then verifying, in a unit 688, the disclosure token $H(K_h)$, see block 621. This can easily be done since in its memory 681 the header key value $K_h$ is already stored. If the result of the verification is positive, the access router then verifies the authenticity of the received message, see block 623, and can decrypt the header key $K_h$ using its own secret key if required and confirm that it is the correct header key.

47. In the case where all verifying and checking operations have been positive, the access router $AR_S$ sends a final confirming KEY_RSV message to the second endpoint S, this message indicating that a secure path has been established over which a packet stream can be transmitted with both a high degree of secrecy and a high quality of service, see block 625. Such a success message can e.g. be prepared by a unit 689.

48. The message is received by the second endpoint S and recognized as a KEY_RSV message, see block 515 of FIG. 5a.

49. The second endpoint S finds the identity of the secure path establishing session with which the received KEY_RSV message is associated and accesses the header key $K_h$ for the session, see block 517.

50. The second endpoint S starts the transmission of a media stream to the first endpoint C by encrypting a first data packet using the header key and sending it to its access node $AR_S$ for further transmission along the established and secure path, see block 519.

51. The first data packet is transmitted along the established path, the nodes in some way knowing that it should follow the path, e.g. finding the address of the next node as stored in the memory of the node, until finally reaching the first endpoint S. Then, following data packets are transmitted in the same way. Assume e.g. that an on-path router $R_j$ needs to perform a link-adaptation of the content or payload of the data packet to better suit a local congested link over which the data packet must travel. The data packet is protected, but with a key that the router $R_j$ knows, i.e. the header key $K_h$ in this embodiment. Hence, the router $R_j$ can decrypt the content, make an adaptation thereof and then re-encrypt the adapted content using the same key before forwarding to the next router along the established path.

If a signature verification during the PATH_INIT procedure fails, the router detecting the failure aborts the procedure and may optionally send a notification which propagates back to the source, i.e. to the second endpoint S in the case described above. The routers through which the notification message passes may then remove the session data from their memories. The source may after having received the notification message proceed in different ways as desired. E.g. it can notify the party requesting the service, i.e. the client C, that it has not possible to establish a secure path and prompt the user for a response whether to make another try.

As the message KEY_RSV propagates back in the "return path" as illustrated in FIG. 4, something can also fail, e.g. one of the signature or MAC verifications can fail. It indicates that something is wrong, and it cannot be excluded that some attacker on the path has been detected by this faked signature. This could mean that the (same) attacker was there also on the path when the PATH_INIT message was transmitted and has not been detected until now. The two endpoints C, S or at least the second endpoint S can then be notified thereof in some suitable way. Note that if a failure of a verification or authenticating step during KEY_RSV occurs in a router, all of the left and right neighbors of the router should be notified so that memory allocated for the considered session can be freed and the header key $K_h$ can be marked as "invalid" by all intermediate routers. A threat is e.g. that the header key $K_h$ has already leaked out and cannot be reused in a re-run of the procedures in which the PATH_INIT and KEY_RSV messages are transmitted. However, assuming that public key retrieval by the routers is done securely, this means that those routers that have already obtained a copy of the header key $K_h$ are "authentic" and that the only "outstanding" (unverified) copy of the header key $K_h$ is still under the protection of the public keys of authentic routers.

To further reduce these risks, the first router $AR_C$ on the path, i.e. the access router of the first endpoint, could hash the header key $K_h$, e.g. applying the hashing function H once, before sending it, as described above encrypted, to the first intermediate node $R_1$. This means that no intermediate router $R_1, R_2, \ldots, R_{i-1}$ knows more than $H(K_h)$ and that the "base" copy of $K_h$ is "unconditionally" secure, even if all other keys are leaked, and thus the original header key $K_h$ can be re-used in a re-run of the secure path establishing session. This may require some changes of the steps in the procedure described above.

Thus, the verification of the disclosure token by comparing it to the hint token is unchanged. In step 32 a key $R_k = H(K_h)$ is inserted in the KEY_RSV message instead of the header key $K_h$ and then encrypted. The KEY_RSV message is in this step authenticated with the modified key $R_k$ and the secure message authentication function M. The message KEY_RSV has then fields containing $H^i(K_h)$, $E(KP_1: R_k)$ and $M(R_k: H^i(K_h), E(KP_1, R_k))$. In step 36 the router $R_1$ now decrypts the modified key $R_k$ using its own secret key and stores it in step 39. The router $R_1$ finds in step 37 the hop count value (i–j) by comparing the stored hint token to the received disclosure token $H^{i-j+1}(K_h)$ and then, if there is no agreement, hashing it and again comparing, etc. The new disclosure token $H^{i-j}(K_h)$ generated in step 38 is obtained by hashing the modified header key $R_k$ (i–j–1) times. In step 40, in modifying the message KEY_RSV in the same way as in step 32, the modified key $R_k$ is encrypted. As in step 32, the KEY_RSV message is authenticated with the modified key $R_k$ using the authentication function M. The message KEY_RSV then has fields containing $H^{i-j}(K_h)$, $E(KP_{j+1}: R_k)$ and $M(R_k: H^{i-j}(K_h), E(KP_{j+1}, R_k))$. In step 45 the access router $AR_S$ can decrypt the modified key $R_k$ using its own secret key if required and confirm that it is correct by hashing header key $K_h$ once.

Alternatively, in the case where not even the access routers $AR_C$ and $AR_S$ are fully trusted, the endpoints S and C could hash the header key $K_h$ once before sharing it with their respective access routers.

In that case, the procedure for location authentication of the first endpoint C in step 6 as described above must, if used, be performed so that the key $K_h$ is not shared with the respective access routers. Also, in step 7 the PATH_INIT message should not be based on the header key $K_h$. Instead a key $R_k = H(K_h)$ is supplied to or accessed by the access routers $AR_S$ and $AR_C$ in steps 10 and 29, respectively, in the procedure described above. This modified key $R_k$ is then used in steps 10-13, 17-21, 27, 28, 30-32, 36-40 and 45 instead of the header key $K_h$.

The PATH_INIT message may also carry a hop counter in which case the current value of the hop counter, i.e. one of the values $1, 2, \ldots, i$, is also stored by each router $R_0, R_1, \ldots R_{i-1}$ on the path. The hop counter $N_j$ can e.g. be set to (i–j) for a router $R_j$. In that case, the message PATH_INIT prepared by the router $R_j$ can have fields containing $N_j$, $H^{i-j+1}(K_h)$ and $Sign(S_j: N_j, H^{i-j+1}(K_h))$, where $N_j$ is the current value (i–j) of the hop counter. Also the KEY_RSV message can be modified to hold a field containing the current value $N_j$ of the hop counter. In the routers the value of the hop counter is evaluated and stored and can be used when required, such as for determining the number of times to apply the hash function H.

In the procedure described above, the following steps may then be modified.

13. The PATH_INIT message is modified by also entering the value $N_i = 0$ of the hop counter therein, compare block 611 of FIG. 6a. The message to be transmitted from the access router $AR_S$ then has at least fields containing $N_i = 0$, $H^2(K_h)$ and $Sign(S_i: N_i, H^2(K_h))$ as illustrated in FIG. 6c.

17. In this step the router $R_{i-1}$ also obtains the hop count $N_i$ or generally $N_{j+1}$, where j=i–1, carried in the received PATH_INIT message, see block 709 of FIG. 7a.

18. The router $R_{i-1}$ also modifies the received hop count $N_{j+1}$ by adding 1 thereto, this new value $N_j$ forming the hop count of the router, this being performed e.g. in a unit 792. Then, the router in a unit 793 stores the incremented hop count, see block 711 and FIG. 7b.

21. In preparing the modified PATH_INIT the router $R_{i-1}$ also includes the hop count $N_j$ of the router, see block 715. The modified message has in this case at least fields containing $N_j$, $H^{i-j+2}(K_h)$ and $Sign(S_j: N_j, H^{i-j+2}(K_h))$ and, where j=i–1, see FIG. 7c.

27. The access router $AR_C$ obtains the received hop count $N_1$ carried in the message, see block 809, 29. The access router $AR_C$ also modifies such as in a unit 889 the received hop count $N_1$ by adding 1 thereto, this new value $N_0 = i$ forming the hop count of the router and giving the total number of hops of the path. The router stores the total count in its memory 881, see block 811 and FIG. 8b, the storing e.g. being executed by a unit 890.

31. In this case the access router $AR_C$ already knows the total hop count $N_0 = i$ and uses it and the header key $K_h$ to calculate the (i+1) times hashed value $H^{i+1}(K_h)$ of the header key and compares it to the received hint token value, this giving a verification both of the received hint token and of the total hop count i, see block 815.

If also the KEY_RSV message is modified to have a field containing a value $N_j$ of the hop counter, the following steps may also be modified.

33. In preparing the KEY_RSV message the access router $AR_C$ also enters the current value of the hop count, i.e. $N_0 = i$ in this case, in the message. The message has at least fields containing $N_0$, $H^i(K_h)$, $E(KP_1: K_h)$, and $M(K_h: N_0, H^i(K_h), E(KP_1, K_h))$, see FIG. 8c.

37. The router $R_1$ first also obtains the hop count value $N_0$ from the message, see block 725. It reduces the received hop count value by 1 and verifies in a unit 794 the result by comparing to the stored value of the hop count of the router itself, see block 726. Thereupon it verifies the now received disclosure token agrees with the hint token stored, see block 727, and then executes the steps illustrated in blocks 729 and 731.

38. This step is not required.

41. In preparing the KEY_RSV message the router $R_1$ also inserts the stored value $N_j$ of the hop count in the message as illustrated in block 741. The message has at least fields containing $N_j$, $H^{i-j}(K_h)$, $E(KP_{j+1}: K_h)$, and $M(K_h: N_j, H^{i-j}(K_h), E(KP_{j+1}: K_h))$, where j=1 for the router $R_1$, see FIG. 7d.

46. In this step the access router $AR_S$ also first obtains the hop count $N_{i-1}$ from the message, see block 619. The access router verifies that the hop count has the value 1, see block 620, this e.g. being executed in a unit 891. Thereupon the steps illustrated in blocks 621 and block 623 are executed as described above.

The access of the public key $KP_i$ in step 17 and the verification of the digital signature of the PATH_INIT message in step 18 as described above may be operations that require a considerable amount of resource and hence, in some cases, these operations can be postponed and then performed in the phase when the KEY_RSV message is transmitted along the router path. In that case at least the following step may be modified:

17. In this step the public key $KP_i$ of the sending router is not accessed.
18. This step is not executed.
19. In this step the router $R_{i-1}$ cannot store the public key of the sending router since it has not yet been accessed.

New steps that are executed between steps 40 and 41 of the procedure described above may include:

40a. The router $R_1$ accesses the public key $KP_2$ of the preceding router $R_2$ and possibly stores it, see block 738 of FIG. 7a.
40b. The router $R_1$ verifies the signature of the PATH_INIT message stored in step 19 using the public key $KP_2$ of the preceding router $R_2$, see block 739.

It is also possible that the path along which the PATH_INIT and KEY_RSV messages has been established before commencing the transmission of the PATH_INIT message. Thus, appropriate addresses may have already been stored in the routers along the path, e.g. in one of the steps 5 and 6 as described above or in a special initial phase for establishing a path in the network. In such an initial case messages that only carry some session identification can be propagated in the two directions. After receiving such a message, a router then stores the session identification together with the address of the sending router in a way similar to the handling of the PATH_INIT and KEY_RSV messages as described above.

In this case, obviously, the steps in the procedure as described above for storing router addresses are not required and also the steps for finding the address of the next router in the first phase of the procedure when the PATH_INIT message is propagated.

In this case also, the senders of the PATH_INIT and KEY_RSV messages can be verified against the addresses stored in the routers along the path. Furthermore, in the procedure described in detail above, the senders of the KEY_RSV messages can be verified in the same way if desired.

Thus generally, a method and system have been described in which a header key $K_h$ is securely and confidentially distributed to a set of stations, nodes or routers located on a path connecting and used by two endpoints for communicating data between them, in order to allow exchange of data packets, which carry QoS information and require a special treatment from these routers.

In particular, while the invention is described only in the context of two end-nodes communicating via a set of routers, as one of skill in the art can easily realize, the invention is equally applicable when end-nodes communicate via one or more intermediaries, e.g. proxies, relays, bridges, transcoders, (media) gateways, etc.

As is obvious to one skilled in the art, the various steps described above can be performed by specially designed units or modules, each step e.g. performed by an individual unit. Also, substeps included in the steps may be performed by specially designed individual units. Furthermore, the steps and/or substeps may be grouped so that the steps and/or substeps of each group is performed by a specially designed individual unit. Also, the order in which the operations are performed can in some cases be changed, e.g. the order in which checking and verifying operations are executed.

While specific embodiments of the invention have been illustrated and described herein, it is realized that numerous other embodiments may be envisaged and that numerous additional advantages, modifications and changes will readily occur to those skilled in the art without departing from the spirit and scope of the invention. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention. Numerous other embodiments may be envisaged without departing from the spirit and scope of the invention.

The invention claimed is:

1. A method of setting up a secure path in a network for establishing a secure communication session between a first endpoint that connects to the network via a first access node of the network and a second endpoint that connects to the network via a second access node of the network, said method comprising:
   sending a path initialization message from the first access node to the second access node, said path initialization message propagated by one or more intermediate nodes in said network establishing a path through said network, and wherein each said intermediate node stores a hint token included in the path initialization message that is derived from cryptographic information to be used for said secure communication session;
   sending a return message from the second access node to the first access node, in response to the second access node receiving the propagated path initialization message, said return message including a disclosure token verifiable using the hint token, and said return message being propagated by each intermediate node back towards the first access node based on each intermediate node verifying the disclosure token via the hint token stored at the intermediate node;
   receiving the return message at the first access node, the return message including a received disclosure token that is both different from and derived from the disclosure token generated by the second access node using the cryptographic information and a predetermined hashing algorithm; and
   indicating to the first endpoint that said path has been established as said secure path, responsive to receiving and verifying the return message at the first access node.

2. The method of claim 1, wherein each intermediate node and said second access node stores the address of the node from which it received the path initialization message, and uses that stored address for propagating the return message back towards the first access node.

3. The method of claim 1, wherein each of the nodes along the path stores an address of the node to which it transmits the path initialization message and wherein propagation of the return message by any said intermediate node is further conditioned on receiving the return message from the same node to which the intermediate node sent the path initialization message.

4. The method of claim 1, wherein at least some of the content of the path initialization message is modified in each of the intermediate nodes, by modifying the hint token according to a predetermined hashing algorithm and replacing the hint token carried in the path initialization message with the modified hint token, before propagating the path initialization message to the next node along the path towards the second access node, and in that at least some of the content of the return message is modified in each intermediate node, by modifying the disclosure token carried in the return message with the predetermined hashing algorithm, before propagating the return message to the next node along the path towards the first access node.

5. The method of claim 4, wherein the hint token and the disclosure token are obtained and modified by transforming a cryptographic key or information derived therefrom using the predetermined hashing algorithm that is iterated or repeated by the nodes along the path.

6. The method of claim 5, wherein the hashing algorithm is predefined and known to each of the nodes.

7. The method of claim 1, wherein each node in the path that sends the path initialization message includes its node sequence number in the path initialization message as sent to the next node, wherein each intermediate node determines its node sequence number by extracting and incrementing the node sequence number received in the path initialization message as sent from the preceding node in the path.

8. The method of claim 7, wherein each node that receives the return message verifying that a node sequence number included in the return message received by the node matches the node sequence number of the node to which it previously sent the path initialization message.

9. The method of claim 7, wherein each intermediate node uses its node sequence number to modify the hint token as included in the path initialization message sent to the next node.

10. The method of claim 1, wherein the first access node obtains the cryptographic information from the first endpoint and the second access node obtains the cryptographic information from the second endpoint.

11. The method of claim 1, wherein the return message includes said cryptographic information for use in said secure communication session, and wherein the intermediate nodes store said cryptographic information for such use.

12. The method of claim 11, wherein the second access node obtains said cryptographic information from the second endpoint.

13. The method of claim 1, wherein said cryptographic information is a header key known to said first and second endpoints, for use in said secure communication session.

14. A first access node for a packet-switching network comprising a plurality of nodes in an Internet Protocol (IP) network, said first access node configured for connecting a first endpoint to the IP network, for establishing a secure communication session with a second endpoint connected to the IP network through a second access node, said first access node comprising:
   a unit configured to receive a path initialization message from the first endpoint and to add a hint token to the path initialization message, said first access node configured to generate the hint token from cryptographic information to be used for secure communication between the first and second endpoints;
   a unit configured to transmit the path initialization message to an immediately succeeding intermediate node on a path through the network that includes one or more intermediate nodes between the first and second access nodes, for propagation to said second access node;
   a unit configured to receive a return message from the second access node, as propagated from the second access node to the first access node by the one or more intermediate nodes along the path, said return message including a received disclosure token that is both different from and derived from a disclosure token generated by the second access node using the cryptographic information and a predetermined hashing algorithm; and
   a unit configured to verify the received disclosure token received in the return message against the hint token;
   wherein said first access node is configured to, responsive to a positive verification of the received disclosure token, send an indication to the first endpoint that the path has been established as a secure path for the secure communication session.

15. The first access node of claim 14, wherein said cryptographic information is a cryptographic key to be used for said secure communication session and wherein said first access node is configured to generate the hint token by modifying or transforming the cryptographic key according to the predetermined hashing algorithm.

16. The first access node of claim 14, wherein the first access node is configured to store an address for the first intermediate node to which it sends the path initialization message and to use that stored address to verify that the return message is received from the same intermediate node.

17. The first access node of claim 14, wherein the first access node is configured to include a node sequence number in the path initialization message that is updated by each succeeding node in the path to assign node sequence numbers for each node along the path, and wherein the first access node is configured to verify that the node sequence number of the intermediate node from which the first access node receives the return message matches the node sequence number of the intermediate node to which the first access node sent the path initialization message.

18. A second access node for establishing a secure path through a packet-switching network comprising a plurality of nodes, to support a secure communication session between a first endpoint that connects to the network through a first access node and a second endpoint that connects to the network through the second access node, said second access node comprising:
   a unit configured to receive a path initialization message from an immediately preceding intermediate node on a path through said network that includes one or more intermediate nodes between the first and second access nodes; and
   a unit configured to extract a received hint token included in the path initialization message that is both different from and derived from a hint token generated by the first access node, said received hint token being derived from cryptographic information to be used for establishing the secure communication session using a predetermined hashing algorithm;
   said second access node configured to verify the received hint token extracted from the path initialization message received at the second access node and, responsive to verifying the hint token, generate a disclosure token from the cryptographic information; and
   said second access node further configured to send a return message, including said disclosure token, to the preceding intermediate node on said path, for propagation back to the first access node, said return message indicating to said first access node that said secure path has been established.

19. The second access node of claim 18, wherein said cryptographic information is a cryptographic key and wherein said second access node is configured to generate the disclosure token by modifying or transforming the cryptographic key according to the predetermined hashing algorithm.

20. The second access node of claim 18, wherein the second access node is arranged to send the return message to the same intermediate node from which it received the path initialization message.

21. A node configured for use in a packet-switching network comprising a plurality of nodes, said node configured to act as an intermediate node on a path between first and second endpoints that connect to the network through first and second access nodes, respectively, said intermediate node being one of one or more intermediate nodes providing a path through the network between the first and second access nodes, and wherein, to act as said intermediate node, said node is configured to:
- receive a path initialization message from the first access node or another intermediate node on the path that is propagating the path initialization message towards the second access node, said path initialization message used for establishing a secure communication path through the network, for supporting a secure communication session between the first and second endpoints;
- extract a hint token from the path initialization message and store the hint token in the intermediate node;
- modify the hint token according to a predetermined hashing algorithm and substitute the modified hint token into the path initialization message for propagation towards the second access node;
- send the path initialization message to the second access node through another intermediate node on the path for propagation towards the second access node;
- receive a return message from the second access node or from another intermediate node on the path;
- verify a disclosure token in the return message against the stored hint token; and
- responsive to positive verification of the disclosure token, modify the disclosure token according to a predetermined hashing algorithm, substitute the modified disclosure token into the return message, and send the return message to the first access node or to another intermediate node for propagation of the return message towards the first access node.

22. The node of claim 21, wherein the return message includes cryptographic information to be used for said secure communication session, and wherein said node is configured to:
- extract said cryptographic information from the return message;
- store said cryptographic information in a memory of the node; and
- later use said cryptographic information for encryption or decryption of messages exchanged between said first and second endpoints as part of the secure communication session.

23. The node of claim 22, wherein said cryptographic information comprises a cryptographic key and wherein the node includes a unit for modifying the disclosure token as included in the return message received by the node, said unit configured to modify the disclosure token by applying the predetermined hashing algorithm to the cryptographic key.

24. The node of claim 23, wherein the unit is configured to obtain a new disclosure token as the modified disclosure token based on applying the hashing algorithm to the disclosure token included in the received return message a number of times determined by a sequential position of the node within the path.

25. The node of claim 21, wherein the path initialization message includes a sequence number, and wherein the node is configured to store an assigned node sequence number representing the node's sequential position within the path, based on extracting the sequence number from the path initialization message, incrementing the extracted sequence number, and storing the resulting incremented sequence number.

26. The node of claim 25, wherein the node is configured to modify the path initialization message for sending to a next node in the path, based on substituting the assigned node sequence number as determined by the node for the sequence number extracted from the path initialization message as received by the node.

27. The node of claim 26, wherein the return message also includes a sequence number, and wherein the node is configured to condition its forwarding of the return message towards the second access node not only on positive verification of the disclosure token, but also on positive verification that the node received the return message from the same node to which the node previously sent the path initialization message.

28. The node of claim 21, wherein the node is configured to store one or more node addresses or sequence numbers in association with the node receiving and forwarding the path initialization message, and wherein the node's forwarding of the return message is conditioned not only on verification of the disclosure token included in the return message, but further on verification, using said stored node addresses or sequence numbers, that the node receives the return message from the same node to which it previously sent the path initialization message.

29. The node of claim 28, wherein the node uses said stored node addresses or sequence numbers to forward the return message to the same node from which it previously received the path initialization message.

* * * * *